Nov. 30, 1943.  D. G. C. HARE  2,335,409
LOCATING POINT OF ENTRY OF WATER INTO BORE HOLES
Filed Aug. 29, 1941
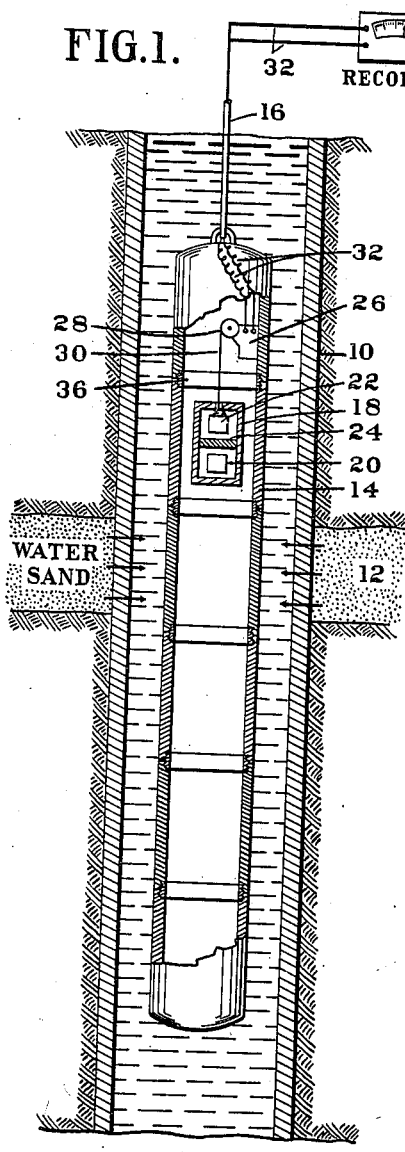
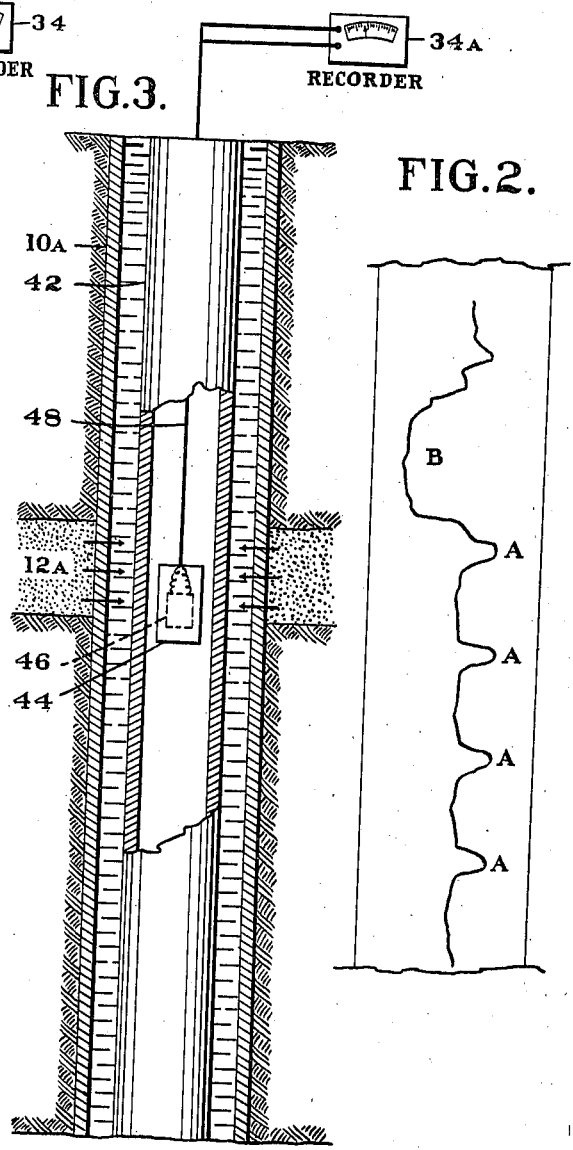
D.G.C. HARE
INVENTOR
HIS ATTORNEYS Patented Nov. 30, 1943

2,335,409

UNITED STATES PATENT OFFICE 2,335,409

LOCATING POINTS OF ENTRY OF WATER INTO BOREHOLES

Donald G. C. Hare, Houston, Tex., assignor, by mesne assignments, to The Texas Company, New York, N. Y., a corporation of Delaware Application August 29, 1941, Serial No. 408,835

9 Claims. (Cl. 250—83.6)

This invention relates to a method of examining the earth formations traversed by a bore hole and more particularly to a method of locating the point or points in such a bore hole where connate fluids are entering the hole. The principal object of the invention is the provision of such a method by means of which the point where water is entering a bore hole may be quickly and accurately determined without the necessity of expensive equipment.

The ordinary methods of lowering an instrument through a bore hole, while in many cases satisfactory for identifying the strata through which the hole has been drilled, tend to disturb the fluid in the hole to such an extent as to make it impossible to determine accurately the position of entry of any fluid coming into the bore hole from the strata. The hole is usually full or at least partly full of fluid which may be a mixture of drilling mud, oil and water and the lowering of any device through the fluid agitates the latter so that any determination made in locating the point of water entry might be inaccurate to the extent of several feet.

In accordance with the present invention an elongated container such as a length of tubing or casing closed at both ends is lowered into the hole to a point approximately opposite the supposed water sand or formation from which the water is entering the hole. The container is then held stationary until the fluids in the hole have reached a condition of equilibrium at which time an instrument in the container capable of detecting the presence of water is caused to move vertically through the container. The instrument is preferably connected electrically with a recording device at the surface and thus, after the instrument has passed through the container from one end to the other, a record will be had which will indicate the point where the water enters the hole. Means are also associated with the container and the instrument therein for indicating on the record the position of the instrument with respect to the container.

For a better understanding of the invention reference may be had to the accompanying drawing in which Fig. 1 is a vertical sectional elevation through a portion of a bore hole with a water detecting instrument in position opposite a water sand;

Fig. 2 illustrates a section of a typical record and

Fig. 3 is a vertical sectional elevation through a bore hole illustrating a modification.

Referring to the drawing, a bore hole 10 is shown as having been drilled through various formations including a water sand 12, the exact location of which it is desired to ascertain. An elongated container 14 which may be a section of pipe closed at both ends is adapted to be lowered into the hole by means of a suitable wire line or cable 16 to a position at or near the location of the entrance of the fluid from the formation 12. Within the container 14 there is a housing 18 in which is disposed a source 20 of penetrative radiation such as fast neutrons and also within the housing 18 is a device 22 such as a boron-tri-fluoride ionization chamber suitable for the detection of slow neutrons. A shield 24 of a suitable material such as cadmium or boron is interposed between the source and the detector to minimize the effect of any slow neutrons which may be emitted directly from the source. The length of the container 14 may depend upon the conditions of use. Thus for locating points of water entry or sands of but a few feet in thickness, a container formed of a 30 foot length of casing should be satisfactory. Obviously the container may, if desired, be considerably longer than this and may be formed of several lengths of casing fastened together to form one elongated chamber.

Various arrangements may be made for lowering the housing 18 through the container 14 and, as an example, a device 26 which may contain a clockwork mechanism or a small electric motor, is provided with a pulley 28 about which is wound a wire cable 30 from which the housing 18 is suspended. The cable 18 contains a pair of wires connected to the detector 22 and also connected through the device 26 to leads 32 passing upwardly through the cable 16 to a suitable recorder 34 at the surface. Disposed within the wall of the container 14 are a plurality of annular members or rings 36 formed of a material such as cadmium which has a strong absorbing power for slow neutrons. The rings 36 are preferably disposed uniformly throughout the length of the container 14 and serve as markers or identification points as will be explained hereinafter.

In the operation of this form of the invention the container 14 with the housing 18 suspended in its upper portion is lowered in the hole 10 to a point at or near the supposed location of the entrance of the connate fluid from the formation 12 into the well. The fluid which is in the well is then replaced preferably by a drilling fluid which has had added to it a small amount of a substance which has the property of strongly absorbing slow neutrons. As such a substance a 5% solution of borax would be satisfactory and a cadmium salt would also be suitable. The container 14 is then held motionless in the hole and the hydrostatic pressure on the connate fluid relieved by removing a portion of the drilling fluid by bailing or otherwise after which time is allowed for the fluid to come to a new state of equilibrium. The measuring unit comprising the source of radiation 20, the detector 22 and the housing 18 is then caused to move downwardly through the interior of the container 14. As already stated, the device 26 may include a clockwork or other mechanism which may be previously set at the surface to release the pulley 28 at a predetermined time, thereby allowing the measuring unit to descend within the container. Any other suitable device may be used for lowering the housing within the container. For instance, the housing may be released by clock work or other means and the housing allowed to settle downwardly through a viscous fluid in the container. As was stated previously, the device 26 may include an electric motor which may be energized when desired to lower or to raise the measuring unit within the casing. The measuring unit may also be designed so as to fit closely in a piston-like fashion within the container and at the desired time a valve in the bottom of the container may be caused to open with the result that the drilling fluid, being under a high hydrostatic pressure, will flow into the container and drive the measuring unit upwards. This would, of course, compress the air above the measuring unit but the hydrostatic pressures commonly encountered are high enough to force this air into a very small volume; thus allowing an adequate travel of the measuring unit.

It may be desirable at times to lower the instrument on an ordinary cable, such as a wire or sand line, which does not provide suitable electrical conductors for transmitting signals to the surface. In this case the instrument would be so designed as to allow the making of a record within the container which has been lowered into the bore hole, which record could be removed and examined on bringing the container to the surface. The point of entry of the connate fluid would then be determined from a knowledge of the depth to which the container had been lowered and the examination of the fiduciary marks placed upon the record as will be described.

The fast neutrons emitted by the source 20 are slowed down due to collisions with the hydrogen nuclei of the surrounding fluids. The slow neutrons are strongly absorbed by the boron which has been added to the drilling fluid and thus, if the container 14 is surrounded by more or less uncontaminated drilling fluid, very few slow scattered neutrons will arrive back at the detector 22. However, as the measuring unit moves along within the container 14 and comes adjacent a water formation such as is shown in 12, from which water is coming into the hole, the drilling fluid being diluted by this water does not contain in sufficient concentration substances which will strongly absorb the slow neutrons. Thus, the number of slow neutrons arriving at the detector 22 will sharply increase when the detector has reached a point opposite the formation 12 from which the water is flowing into the hole.

When the detector 22 passes those points in the container 14 opposite the cadmium bands or rings 36, there will be little if any response in the detector since most of the slow neutrons will be absorbed by the cadmium. The record of the response of the detector as a function of its position within the container 14 can be made photographically or otherwise by means of the recorder 34. (A sample of a typical record is shown in Fig. 2 in which 38 is a section of photographic film or sensitized paper. The breaks A in the curve 40 indicate the decrease in intensity of the neutrons due to the cadmium rings 36, whereas the sharp break B indicates an increase in the number of neutrons arriving at the detector 22 as a result of dilution of the well fluid by means of the entry of the water.

In another method of locating the point of entry of the water, a small quantity of a radioactive substance such as carnotite ore can be placed in the drilling fluid and the neutron source 20 may then be dispensed with an instead of the slow neutron detector 22, a detector suitable for the detection of gamma rays can be substituted. In operation, there will be a fairly high constant pick up by the detector as long as the measuring instrument is surrounded by undiluted drilling fluid and a sudden decrease in the reading will occur when the measuring unit reaches a point adjacent the entering water. The markers 26 in this case could be made of lead rather than cadmium.

In still another method the normal drilling fluid can be used without the addition of any foreign substance, whereby the natural radioactivity of the drilling fluid would be detected and recorded. The connate waters entering the bore hole will have a different radioactivity than that of the drilling fluid and the resulting record will indicate the position of the water entry as has already been described.

In Fig. 3 a modification is illustrated in which a drill stem or string of tubing 42 is placed in the hole 10a, a measuring unit 44 containing a radiation detector 46 then being lowered through the tubing after the fluids in the hole around the tubing string have reached a condition of equilibrium. The detector 46 connected to the recorder 34a by means of electric cable 48 will then indicate a variation in the natural radioactivity of the surrounding fluids when the measuring unit is lowered adjacent the water sand 12a. Of course, the unit 44 could be formed substantially as is shown in Fig. 1 with a source of radiation in addition to the detector 46 and a measurement made of the variations in the amount of slow neutrons as the unit passes through the tubing string. In the method shown in Fig. 3 the tubing 42 may be provided with markers similar to the rings 36 of Fig. 1 or a record may be kept of the depth of the unit 44 by means of a suitable line measuring device at the surface.

It is understood that if the resulting record 38 does not intidicate a break in the curve signifying the point of water entry, the container may be repositioned within the hole until some portion of it is opposite the water sand, and the before described operation repeated to locate the exact point of water entry.

Obviously many modifications and variations of the invention, as hereinbefore set forth, may be made without departing from the spirit and scope thereof, and, therefore, only such limitations should be imposed as are indicated in the appended claims.

I claim:

1. The method of locating the point of entry of connate fluids into a bore hole which comprises placing an elongated cylindrical member in the hole so that it will be surrounded by the fluids in the hole, reducing the pressure on the fluids in the hole, permitting the fluids surrounding the cylindrical member to reach equilibrium, moving a device capable of detecting natural radiation vertically within said cylindrical member and noting the position of the device when a sudden increase or decrease in the detected radiation is observed.

2. The method of locating the point of entry of connate fluids into a bore hole containing a drilling fluid which comprises forming a vertical chamber within said hole, replacing said drilling fluid with a fluid containing a small amount of a radiactive substance, reducing the pressure on the fluids then in the hole, lowering a radiation detector through said chamber, and observing variations in the amount of radiation detected as said source and detector pass through the length of said chamber.

3. The method of locating the point of entry of connate fluids into a bore hole containing a drilling fluid which comprises forming a vertical chamber within said hole at approximately the location of said point of entry, replacing said drilling fluid with a fluid containing a small percentage of a radioactive substance, reducing the pressure on the latter fluid, allowing the fluid to reach a state of equilibrium, and detecting within and throughout the length of said chamber the radioactivity of said drilling fluid.

4. The method of locating the point of entry of connate fluids into a bore hole containing a drilling fluid which comprises forming a vertical chamber within said hole at approximately the location of said point of entry, replacing said drilling fluid with a fluid containing a small amount of a substance having the property of strongly absorbing slow neutrons, decreasing the pressure on the last mentioned fluid, lowering a source of fast neutrons and a detector of neutrons through said chamber and noting variations in the number of slow neutrons scattered in the last mentioned fluid and in the formations surrounding the hole and returned to the detector.

5. The method of locating the point of entry of water into a bore hole containing a drilling fluid which comprises forming a vertical chamber within said hole at approximately the location of said point of entry, replacing said drilling fluid with a fluid containing a small percentage of a borax solution, reducing the pressure on the last mentioned fluid, lowering a source of fast neutrons and a detector of slow neutron through said chamber and noting variations in the number of slow neutrons scattered in the last mentioned fluid and returned to the detector 6. The method of locating the point of entry of connate fluids into a bore hole containing drilling fluid which comprises forming a vertical chamber within said hole at approximately the location of said point of entry so that the chamber will be surrounded by the drilling fluid, reducing the pressure on said drilling fluid, allowing the fluid in the hole to reach a state of equilibrium, and detecting within and throughout the length of said chamber the radioactivity of the strata surrounding the hole while observing predetermined intervals the position of the detecting means within the chamber.

7. The method of locating the point of entry of connate fluids into a bore hole containing drilling fluid which comprises forming a vertical chamber within said hole at approximately the location of said point of entry, replacing said drilling fluid with a fluid containing a small amount of a substance having the property strongly absorbing slow neutrons, reducing the pressure on the last mentioned fluid, lowering source of fast neutrons and a detector of slow neutrons through said chamber, noting when said source and detector pass predetermined points in said chamber and observing variations in the number of slow neutrons detected as said source and detector pass through the length said chamber.

8. The method of locating the point of entry of connate fluids into a bore hole which comprises lowering an elongated vertical chamber within the hole to a point opposite the supposed entry of said fluids, reducing the pressure the fluids within the hole, and detecting within and throughout the length of said chamber the radioactivity of the formations opposite the chamber.

9. The method of locating the point of entry of connate fluids into a bore hole which comprises forming an elongated vertical chamber within the hole at the depth of the supposed entry of said fluids, reducing the pressure on the fluids within the hole, lowering a source of fast neutrons and a detector of neutrons through said chamber and noting the variations in the number of neutrons scattered back to the detector by the formations surrounding the hole.

DONALD G. C. HARE